United States Patent [19]
Pedersen

[11] Patent Number: 5,215,158
[45] Date of Patent: Jun. 1, 1993

[54] HYDRAULIC STEERING SYSTEM FOR VEHICLES

[75] Inventor: Harry E. Pedersen, Nordborg, Denmark

[73] Assignee: Danfoss A/S, Nordborg, Denmark

[21] Appl. No.: 767,473

[22] Filed: Sep. 30, 1991

[30] Foreign Application Priority Data

Mar. 21, 1991 [DE] Fed. Rep. of Germany ....... 4031951

[51] Int. Cl.$^5$ ............................ B62D 5/06; B62D 5/09
[52] U.S. Cl. ....................... 180/132; 60/387; 60/422; 180/141
[58] Field of Search ............... 180/132, 141, 142, 143; 60/387, 422

[56] References Cited

U.S. PATENT DOCUMENTS

| | | | |
|---|---|---|---|
| 4,336,687 | 6/1982 | Morgan | 60/422 |
| 4,356,759 | 11/1982 | Ljubimov et al. | 180/132 |
| 4,665,695 | 5/1987 | Rau et al. | 180/132 |
| 5,020,618 | 6/1991 | Nagao | 180/132 |

Primary Examiner—Mitchell J. Hill
Attorney, Agent, or Firm—Wayne B. Easton

[57] ABSTRACT

The steering system of a motor vehicle includes a two chamber steering motor having the application of pressurized fluid applied thereto through change over valves in one position by the way of a by pass valve and alternately in a second position by the way of a steering unit. The change over valves are operated from their first position to their second position upon activation of the steering unit which results in control valve moving from a position applying pressurized fluid from a pump to the by pass valve to a position applying pressurized fluid from the pump to the steering unit.

1 Claim, 1 Drawing Sheet

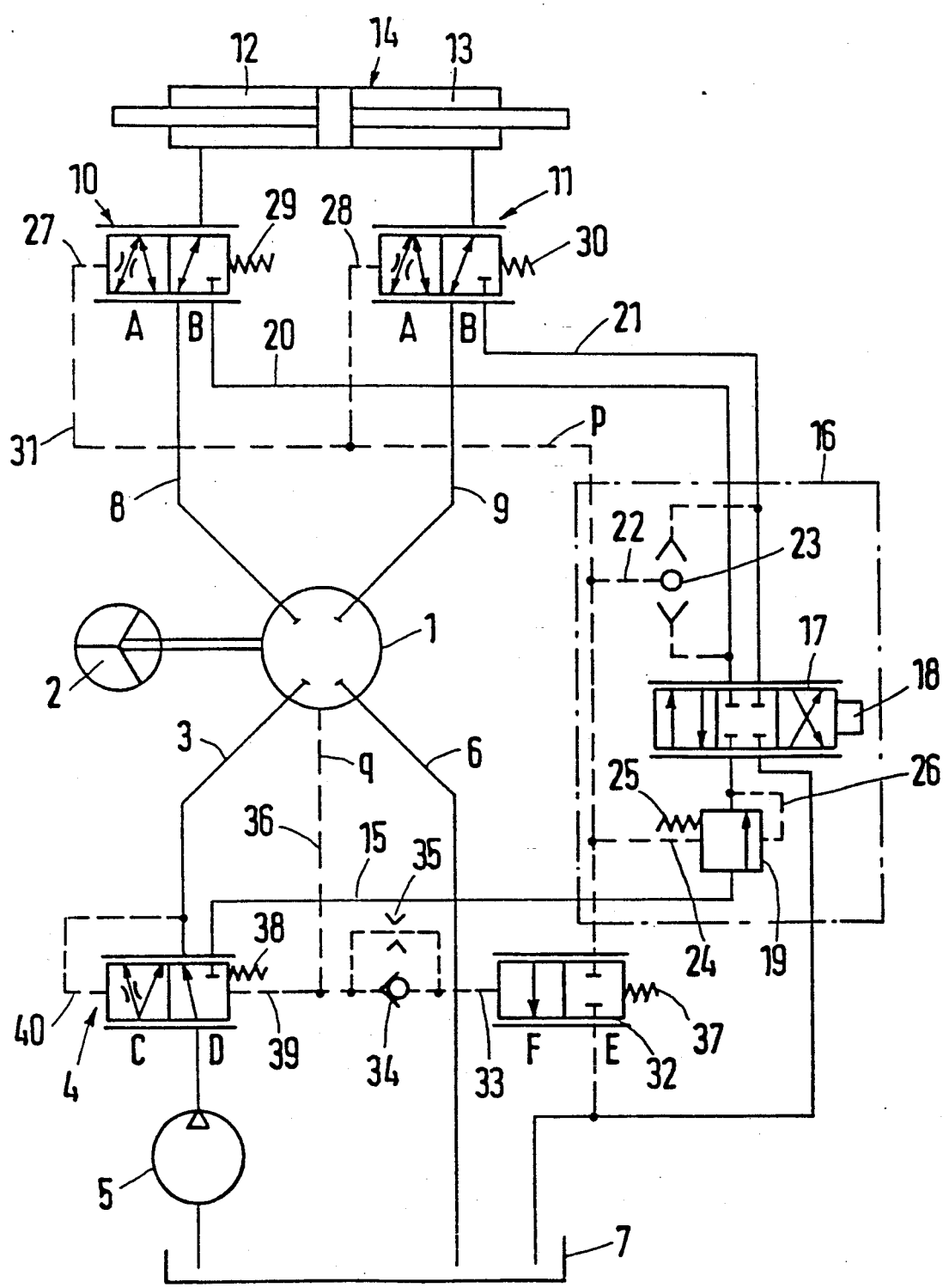

HYDRAULIC STEERING SYSTEM FOR VEHICLES

BACKGROUND OF THE INVENTION

The invention relate to a hydraulic steering system for vehicles in which the steering motor is arranged to be supplied with compressed fluid by way of a steering unit adjustable by means of a steering element.

Vehicles which are equipped with such a hydraulic steering system have the advantage that it is only hydraulic lines that require to be arranged between the driver's cab and the wheels to be steered; no mechanical linkage is required. The known steering units, for example of type OSPC manufactured by the Applicant, ensure that an amount of compressed fluid proportional to the angle of rotation of the steering handwheel is supplied to the steering motor. it is also allowed to drive such vehicles to be driven on roads.

It is frequently desirable for the wheels of a vehicle to be adjusted more quickly than corresponds to normal steering operation. This applies, for example to work vehicles such as shovel dredgers, excavators, center-pivot steered vehicles and so on, which are intended to carry out rapid movements at the site of use.

SUMMARY OF THE INVENTION

The invention is based on the problem of providing a hydraulic steering system of the kind mentioned in the introduction which allows rapid adjustments of the steering motor without sacrificing steering safety.

This problem is solved according to the invention in that the steering motor is arranged to be supplied selectively with compressed fluid by way of a by-pass valve, each motor chamber of the steering motor is connected by way of a change-over valve in the first position thereof to a motor line of the by-pass valve and in the second position thereof, with the last-mentioned motor line simultaneously being blocked, to a motor line of the steering unit, and the change-over valve, of which there is at least one, is arranged to be switched from the first into the second position in dependence on the activation of the steering unit.

When the by-pass valve is rendered active, the steering motor receives its compressed fluid with the steering unit being by-passed. The steering motor is therefore able to adjust itself rapidly. This is at the expense of steering safety, however, because, when in normal steering mode, for example on the road, the by-pass valve is inadvertently operated, the vehicle is no longer steerable.

With the aid of the change-over valve, of which there is at least one, the steering unit receives priority over the by-pass valve. As soon as the steering element is operated, the change-over valve blocks the path containing the by-pass valve. Even an inadvertent operation of the by-pass valve therefore has no effect on the steering movement.

The separation effected by the change-over valve also enables the steering unit to be operated manually in the event of pump failure, because all of the supplied compressed fluid passes to the steering motor and is unable to escape by way of the by-pass valve. Also in the event of a pipeline break in the bridging branch, steering ability is maintained. A further advantage lies in the fact that, in the event of a maloperation of the by-pass valve, a brief activation of the steering handwheel will suffice to annul the departure from proper operation.

It is especially convenient for the by-pass valve to be a proportional valve. Proportional valves comprise a displacement-type valve adjustable by means of a setting device and an upstream compensation valve which holds the pressure drop at the displacement-type valve constant. With the aid of this proportional valve the adjustment speed of the steering motor can be selected and thus adapted to the operating conditions.

It is especially convenient for the change-over valve, of which there is at least one, to be arranged to be operated in dependence on the level of a control pressure in a control pressure line, and at a high control pressure to assume the first position and at a lower control pressure to assume the second position, and for the control pressure line to be connected with a source of pressure and to be arranged to be connected to the tank by way of a control valve responding when the steering unit is commissioned. The control pressure, which can easily be generated in hydraulic systems, serves not only as a signal, but also as an energy carrier.

In particular, the load pressure line of the proportional valve may serve as the source of pressure. This makes for an especially simple construction.

In further development, provision is made for the steering unit to comprise a load pressure line and for the control valve to respond in dependence on the appearance of the load pressure in the steering unit. The signal that indicates the operation of the steering unit is also therefore hydraulically tapped. Alternatively, however, the operating signal can be tapped at other locations, for example at the steering wheel shaft.

It is a further advantage that a common pump feeds both the steering unit and the by-pass valve by way of a priority valve, and that the steering unit lies in that branch of the priority valve having priority. The priority valve additionally ensures that the steering unit has priority over the bypass valve.

THE DRAWINGS

The invention is explained in detail below with reference to an embodiment illustrated in the drawing. The single figure shows a circuit diagram of the steering system according to the invention.

DESCRIPTION OF PREFERRED EMBODIMENTS

A steering unit 1, which is adjustable with the aid of a steering element 2, here a steering handwheel, comprises a pump line 3, which is supplied with compressed fluid by way of a priority valve 4 from a pump 5, furthermore a tank line 6, which leads to the tank 7, and two motor lines 8 and 9, each of which is connected by way of a respective change-over valve 10, 11 to a respective motor chamber 12, 13 of a steering motor 14, which in the customary manner operates wheels that are to be steered.

A working line 15 leads from the priority valve 4 to a by-pass valve 16 which comprises a displacement-type valve 17 with a setting device 18 and an upstream compensation valve 19. From here, two motor lines 20, 21 lead to the change-over valves 10 and 11 respectively. The higher load pressure p prevailing in the motor lines 20, 21 is detected with a load pressure line 22, by way of a change-over valve 23, and supplied to the compensation valve 19 at the control input 24. A spring 25 also acts in the same direction and, at the control input 26 acting in the opposing direction, the pressure upstream of the displacement-type valve 17 is effective. The compensation valve 19 therefore holds the pressure drop at the throttle of the displacement-type valve 17 constant.

The load pressure p also acts at the control inputs 27 and 28 of the change-over valves 10 and 11, the sliders of which are biassed in the opposing direction by a spring 29 and 30 respectively. The control pressure line 31 carrying the load-pressure pressure is furthermore provided with a control valve 32 which either produces a connection to the tank 7 or blocks this connection. By way of the parallel combination of non-return valve 34 and throttle 35, the load pressure q of the steering unit 1 is supplied by way of its load pressure line 36 to the control input 33 of the control valve 32. In the opposing direction, the control valve 32 is biassed by a spring 37. The load pressure q also acts together with a spring 38 on the control input 39 of the priority valve 4, the other control input 40 of which is supplied with the pressure in the pump line 3.

The mode of operation is as follows:

When the setting device 18 of the proportional valve 16 is operated, compressed fluid flows from the pump 5 by way of the priority valve 4, the working line 15, the proportional valve 16 and the one change-over valve 10 to the motor chamber 12, while the other motor chamber 13 is connected by way of the other change-over valve 11 and the displacement-type valve 17 to the tank 7. The load pressure in the motor line 20 then ensures an increased control pressure p in the control pressure line 31, so that the two change-over valves assume their position A. And since the steering unit 1 is not operated and therefore no load pressure q appears on the load pressure line 36, the priority valve 4 is in position C. If the steering element 2 is now operated, an increased load pressure q appears on the control pressure line 36. As a result, first the slider of the priority valve 4 is displaced towards position D, so that the steering unit 1 receives sufficient compressed fluid. Secondly, the control valve 32 is displaced from its position E into position F, whereby the control pressure line 31 is connected to the tank 7 and therefore carries the tank pressure. The change-over valves 10 and 11 therefore change to position B in which the motor lines 8 and 9 of the steering unit 1 are connected to the motor chambers 12 and 13, while the motor lines 20 and 21 of the by-pass valve are blocked. Now the steering system operates with the steering unit unaffected by the by-pass valve 16.

In this manner, the steering system operated by the steering element has first priority. Despite the option of being able to perform a rapid adjustment of the steering motor with the proportional valve 16, trouble-free steering is reliably ensured, that is, the vehicle can be operated even on the road.

The action of the change-over valves 10 and 11 can also be exploited in order immediately to suppress errors that appear in the event of a maloperation in the branch of the proportional valve. The steering element 2 merely has to be adjusted slightly. The separation of the motor lines 20 and 21 in the bridging branch also allows a trouble-free steering operation if the bridging branch should have a line break. And even if the pump should fail, the steering motor can be operated by manual operation of the steering element 2, because all of the fluid conveyed to it is passed to it as compressed fluid.

The proportional valve 16 can be operated in known manner. That means that the setting device 18 can be operated not only mechanically, but also hydraulically, electrically or in some other manner.

The steering motor 14 can also comprise two cross-connected cylinders with four motor chambers; then, one change-over should be provided for each motor chamber. The change-over valves 10 and 11 can also be combined to one unit. Because a blocking of the motor lines 8, 9 in position A of the change-over valves does not matter, these change-over valves can be identical, with the exception of the type of connection, with the priority valve.

I claim:

1. A hydraulic steering system for vehicles, comprising, a pump and a tank, a steering motor for operating a vehicle steering mechanism which motor has complementary first and second motor chambers, a steering unit having left, right and neutral positions and a steering element for selecting said positions, a load pressure line for said steering unit being pressurized only when said steering unit is in its neutral position, said steering unit being connected during normal operation via pump and tank lines respectively to said pump and said tank and via first and second motor lines to said first and second motor chambers, bypass directional valve means having left, right and neutral positions for effecting quicker than normal steering movements being connected during a by-pass mode operation via pump and tank lines respectively to said pump and said tank and via first and second motor lines to said first and second motor chambers, a setting control element for moving said bypass directional valve means from a neutral position to either a desired left or a desired right turning position, priority valve means connected to said load pressure line having a first mode position during turns when said load pressure line is not pressurized and a second mode bypass position when said steering unit is in a neutral position and said pressure line is pressurized, said priority valve means being operable during said first mode to connect said pump to said steering unit and operable during said second mode to connect said pump to said bypass valve unit, selection valve means having normal and bypass operating positions for respectively connecting said steering unit motor lines and said bypass unit motor lines to said first and second motor chambers, and check valve means connecting said selection valve means to said bypass unit motor lines to effect moving said selection valve means to said bypass operating position when either of said bypass unit motor lines is pressurized.

* * * * *